US008141135B2

(12) United States Patent
Nagami et al.

(10) Patent No.: US 8,141,135 B2
(45) Date of Patent: Mar. 20, 2012

(54) INFORMATION PROCESSING SYSTEM, TERMINAL, INFORMATION PROCESSING APPARATUS, AND MANAGEMENT SERVER

(75) Inventors: Akihisa Nagami, Yokohama (JP); Yukinobu Mizoguchi, Odawara (JP); Fumio Noda, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 864 days.

(21) Appl. No.: 11/863,762

(22) Filed: Sep. 28, 2007

(65) Prior Publication Data
US 2008/0104683 A1    May 1, 2008

(30) Foreign Application Priority Data

Sep. 29, 2006  (JP) .................................. 2006-268968

(51) Int. Cl.
G06F 17/30 (2006.01)
G06F 15/167 (2006.01)

(52) U.S. Cl. .......................................... 726/5; 709/201
(58) Field of Classification Search ....... 726/5; 709/201
See application file for complete search history.

(56) References Cited

U.S. PATENT DOCUMENTS

| 7,590,873 B2 * | 9/2009 | Takahashi et al. ............ 713/300 |
| 2002/0169967 A1 * | 11/2002 | Varma et al. ................... 713/185 |
| 2002/0194003 A1 * | 12/2002 | Mozer ........................ 704/270.1 |
| 2004/0148526 A1 * | 7/2004 | Sands et al. ................... 713/202 |
| 2005/0160251 A1 * | 7/2005 | Zur et al. ........................... 712/1 |
| 2005/0181870 A1 * | 8/2005 | Nguyen et al. ................... 463/29 |
| 2006/0053215 A1 * | 3/2006 | Sharma ........................... 709/223 |
| 2006/0143262 A1 * | 6/2006 | Cromer et al. ................... 709/201 |
| 2006/0161972 A1 * | 7/2006 | Cromer et al. ....................... 726/5 |
| 2007/0130342 A1 * | 6/2007 | Ishida et al. .................... 709/226 |
| 2007/0220120 A1 * | 9/2007 | Tsunehiro et al. ............. 709/220 |

FOREIGN PATENT DOCUMENTS

| JP | 2005-235159 | 9/2005 |
| JP | 2005-327233 | 11/2005 |
| JP | 2007-133572 | 5/2007 |
| JP | 2007-133666 | 5/2007 |
| JP | 2007-133709 | 5/2007 |
| WO | 02/099742 A1 | 12/2002 |

* cited by examiner

Primary Examiner — Techane Gergiso
(74) Attorney, Agent, or Firm — Mattingly & Malur, PC

(57) ABSTRACT

An information processing system has an information processing apparatus and a terminal coupled to each other through a network. The terminal has an address acquiring unit that reads storage information of a portable storage medium used by a user of the terminal to acquire the address of the information processing apparatus that is a utilization allocation destination of the terminal that is included in the storage information, and stores the address in a memory. A connection is established between the information processing apparatus and the terminal through the network. A remote controlling unit transmits operating information input at an interface of the terminal to the address of the information processing apparatus and receives video information corresponding to the operating information from the information processing apparatus to display video information on an output interface of the terminal.

11 Claims, 8 Drawing Sheets

INFORMATION PROCESSING SYSTEM, TERMINAL, INFORMATION PROCESSING APPARATUS, AND MANAGEMENT SERVER

CROSS-REFERENCE TO RELATED APPLICATIONS

The present application claims a priority from Japanese Patent Application No. 2006-268968 filed on Sep. 29, 2006, the content of which incorporated herein by reference.

BACKGROUND OF THE INVENTION

The present invention relates generally to an information processing system, a terminal, an information processing apparatus, and a management server, and more particularly, to control of connection between a security PC and a blade server in a thin client system.

Due to needs of countermeasure for information leaks and internal control in companies, etc., a concept of thin client appears where a dedicated computer (thin client) having no hard disk apparatus, etc., and having only minimum functions such as displaying and inputting is employed as a client computer to unify the management of resources such as application software in a server (blade server).

With regard to technologies related to such a thin client system, for example, for the purpose of providing a secure remote access system which improves user-friendliness by using a storage device having a built-in tamper-proof device as a user authentication device in the secure remote access system in which a user accesses a server while performing encrypted communication from an indefinite client, thereby performing a task, a remote access system has been proposed that includes a server, a client device accessing the server, a network connecting the server and the client device, a remote control application program connected to the client device to remotely control the server, an encryption application program encrypting communications over the network, and a storage medium having a business application and authentication information stored in a tamper-proof region for the remote control of the server; the storage medium has middleware stored thereon to drive the remote control application, the encryption application, and the business application to be operated on the client device; and the CPU of the client device executes the middleware to operate a file access application interface and a file access driver when performing file access and to operate an interface handler and a device driver for communication between the sever and the client device when performing an authentication process. See, for example, Japanese Patent Application Laid-Open Publication No. 2005-235159.

For the purpose of constructing a computer system capable of always executing processing in the same environment without depending on a terminal device directly used by a user, that is, without depending on a place or an appliance of a client used by the user, a computer system has been proposed that includes a computer apparatus having a plurality of computer boards, a storage apparatus connected to the computer apparatus through a network and having a plurality of storage areas, a management computer that manages the computer apparatus and the storage apparatus, and a terminal apparatus connected to the management computer through a network; the management computer includes a first table defining a correlation between user information and the storage areas; if a utilization request for the computer board including user information is transmitted from the terminal apparatus, the management computer selects an unutilized computer board among the plurality of computer boards, sends back an available computer board number to the terminal apparatus, assigns a storage area corresponding to the user information based on the first table, and transmits an address identifying the storage area to the computer apparatus. See, for example, Japanese Patent Application Laid-Open Publication No. 2005-327233.

For the purpose of improving security of a storage apparatus, an apparatus has been proposed that includes a flash memory chip, an IC card chip capable of executing a security process (such as encryption and decryption), and a controller chip that controls reading/writing of data from/to the flash memory chip and the IC card chip in accordance with a request from a host. See, for example, PCT International Patent Publication No. WO/02099742A1.

SUMMARY OF THE INVENTION

Generally, in a thin client system, a management server needs to determine a connection between a thin client and a blade server that the thin client uses. That is, data communication between the thin client and the blade server is enabled by the management server when the management server becomes a mediator.

Therefore, when the thin client is started up, an access must be always made to the management server. For example, when many thin clients respectively make accesses simultaneously to the management server at the start of the day's operation in an office, concentration of the load on the server is a problem. When a fault has occurred to the management server that administers the connection between the thin client and the blade server, a problem is arisen that utilization of the thin client cannot be started during the time period up to the recovery of the management server. On the other hand, assuming that a user instructs information of the blade server that is the connection destination of the thin client using an input interface, etc., of the thin client, a problem is arisen that the information of the connection destination blade server is leaked to a third party or that restraining an unauthorized access by a third party to the blade server becomes difficult.

The present invention was conceived in view of the above problems and provides a technique that enables a thin client system to realize improvement of the efficiency and securing of appropriate security of a connection process between a thin client and a blade server.

According to a first aspect of the present invention there is provided an information processing system having an information processing apparatus and a terminal that are coupled to each other through a network, wherein the terminal comprises an address acquiring unit that reads storage information of a portable storage medium used by a user of the terminal, acquires the address of the information processing apparatus that is a utilization allocation destination of the terminal that is included in the storage information, and stores the data of the address in a memory; a connection establishing unit that transmits a connection establishment request including at least authentication information of the terminal or the user thereof to the address of the information processing apparatus stored in the memory, the connection establishing unit executing a process of establishing connection between the information processing apparatus and the terminal through the network according to response data that the information processing apparatus returns in response to the connection establishment request; and a remote controlling unit that, associated with the execution of the connection establishing process, transmits operating information input at an input interface of the terminal to the address of the information processing apparatus, receives video information corresponding to the operating information from the information processing apparatus, and displays the video information on an output interface of the terminal, and wherein the information processing apparatus comprises a connection management table having stored thereon authentication information of the terminal or of the user thereof, that is allocated for utilization to the information processing apparatus; an establishment determining unit that receives the connection establishment request transmitted from the terminal, compares the authentication information of the terminal or the user thereof included in the connection establishment request with the connection management table, determines to permit or reject acceptance of the connection establishment request, and returns the determination result to the terminal as response data; and a remote operation accepting unit that, associated with the execution of the connection establishing process with the terminal in response to the determination result, receives the operating information from the terminal, executes information processing according to the contents of operations indicated by the operating information, and transmits the video information indicating the result of the information processing to the terminal.

This enables the thin client system to realize improvement of the efficiency and securing of appropriate security of a connection process between a thin client and a blade server.

In the information processing system, the terminal may comprise an authentication information acquiring unit that acquires the storage information of the portable storage medium that includes the address of a management server that executes a utilization allocating process between the terminal and the information processing apparatus from a reader of the portable storage medium 50, and stores the storage information in an appropriate memory; a utilization allocation request transmitting unit that transmits the storage information of the portable storage medium read from the memory to the address of the management server read from the memory including the storage information in the utilization allocation request of the information processing apparatus; and an address storage processing unit that receives from the management server the address of the information processing apparatus to be assigned to this terminal, and stores the address of the information processing apparatus in the portable storage medium, and wherein the management server may comprise an allocation management table having stored thereon the correlation between the storage information of the portable storage medium that the user of each terminal uses and the address of the information processing apparatus that is a utilization allocation destination of the terminal tied to the portable storage medium; and an address notifying unit that receives from the terminal the utilization allocation request that includes the storage information of the portable storage medium, compares the storage information of the portable storage medium included in the utilization allocation request with the allocation management table, identifies the address of the information processing apparatus, and notifies the terminal that is the transmission origin of the utilization allocation request of the identified address. This enables a management server to, prior to the start of using the thin client, have determined a blade server that is available for the thin client, and the thin client to acquire information on the blade server.

In the information processing system, the terminal may comprise a reallocation request transmitting unit that transmits a reallocation request of the information processing apparatus input at the input interface of the terminal, together with the storage information of the portable storage medium, to the address of the management server, wherein the address storage processing unit receives from the management server the address of an available information processing apparatus that is re-assigned to the terminal and executes a process of storing the address of the information processing apparatus in the portable storage medium, wherein the management server comprises a reallocation processing unit that, when the reallocation processing unit receives the reallocation request that includes storage information of the portable storage medium from the terminal, identifies in the allocation management table an available information processing apparatus that is not allocated for utilization to another terminal, and stores the address of the available information processing apparatus and the storage information included in the reallocation request correlating each other in the allocation management table, and wherein the address notifying unit notifies the terminal that is the transmission origin of the reallocation request of the address of the available information processing apparatus. This enables, in the state where a fault has occurred to a network between the thin client and the blade server or to the blade server, etc., and the blade server can not be used, another available blade server to be quickly assigned to the thin client and, therefore, maintenance of the convenience and the business efficiency of a user of the thin client can be facilitated.

In the information processing system, the reallocation request transmitting unit of the terminal may execute a process of transmitting the reallocation request by detecting that at least one of the connection establishing process by the connection establishing unit to the information processing apparatus, the transmitting process of the operating information addressed to the information processing apparatus by the remote controlling unit, and the receiving process of the video information from the information processing apparatus becomes not executable. This enables reallocation of blade servers to be executed without need of being aware of by the user of the blade server and, therefore, a smooth re-assigning process and maintenance of the convenience and the usability for the user due to this process can be facilitated.

According to a second aspect of the present invention there is provided a terminal coupled to an information processing apparatus through a network, comprising an address acquiring unit that reads storage information of a portable storage medium used by a user of the terminal, acquires the address of the information processing apparatus that is a utilization allocation destination of the terminal that is included in the storage information, and stores the data of the address in a memory; a connection establishing unit that transmits a connection establishment request including at least authentication information of the terminal or the user thereof to the address of the information processing apparatus stored in the memory, and executes a connection establishing process between the information processing apparatus and the terminal through the network according to response data that the information processing apparatus returns in response to the connection establishment request; and a remote controlling unit that, associated with the execution of the connection establishing process, transmits operating information input at an input interface of the terminal to the address of the information processing apparatus, receives video information corresponding to the operating information from the information processing apparatus, and displays the video information on an output interface of the terminal. This enables the thin client system to realize improvement of the efficiency and securing of appropriate security of a connection process between the thin client and the blade server.

According to a third aspect of the present invention there is provided an information processing apparatus coupled to a terminal through a network, comprising a connection management table having stored thereon authentication information of the terminal, or the user thereof, that is allocated for utilization to the information processing apparatus; an establishment determining unit that receives the connection establishment request transmitted from the terminal, compares the authentication information of the terminal or the user thereof included in the connection establishment request with the connection management table, determines to permit or reject acceptance of the connection establishment request, and returns the determination result to the terminal as response data; and a remote operation accepting unit that, associated with the execution of the connection establishing process with the terminal in response to the determination result, receives the operating information from the terminal, executes information processing according to the contents of operations indicated by the operating information, and transmits the video information indicating the result of the information processing to the terminal. This enables the thin client system to realize improvement of the efficiency and securing of appropriate security of a connection process between a thin client and a blade server.

According to a fourth aspect of the present invention there is provided a management server coupled to an information processing apparatus and a terminal that uses the information processing apparatus, comprising an allocation management table having stored thereon the correlation between the storage information of the portable storage medium that the user of each terminal uses and the address of the information processing apparatus that is a utilization allocation destination of the terminal tied to the portable storage medium; and an address notifying unit that receives from the terminal the utilization allocation request that includes the storage information of the portable storage medium, compares the storage information of the portable storage medium included in the utilization allocation request with the allocation management table, identifies the address of the information processing apparatus, and notifies the terminal that is the transmission origin of the utilization allocation request of the identified address. This enables the thin client system to realize improvement of the efficiency and securing of appropriate security of a connection process between a thin client and a blade server.

The other problems and solving methods thereof that the present application discloses will become apparent from the following description of the embodiment of the present invention and the accompanying drawings.

DETAILED DESCRIPTION OF THE EMBODIMENTS

—System Configuration—

Figure 1:
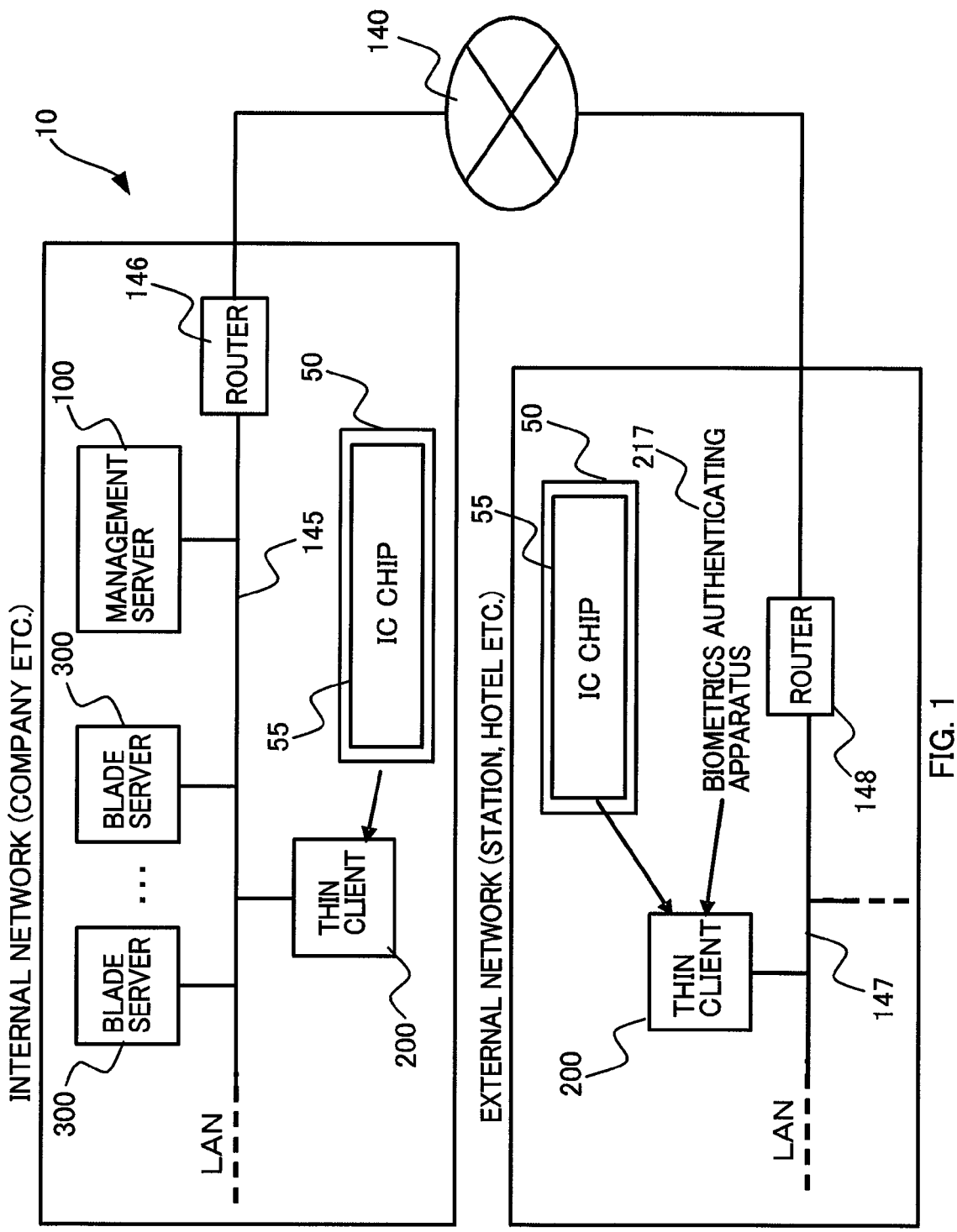
FIG. 1 depicts a network configuration of a thin client system that is an information processing system of an embodiment.

Description will be given in detail for an embodiment of the present invention referring to the accompanying drawings. FIG. 1 depicts the network configuration of a thin client system that is an information processing system of the embodiment. The thin client system (information processing system) 10 depicted in FIG. 1 is a system including a plurality of information processing apparatuses 300, a management server 100 that manages the information processing apparatuses 300, and a plurality of terminals 200, that are coupled to each other through a network 140. For example, blade servers 300 as the information processing apparatuses and thin clients 200 as the terminals can be assumed for the system. Data communication between a thin client that is one of the terminals 200 and a blade server that is one of the information processing apparatuses 300 is usually processed directly between the thin client 200 and the blade server 300 not through the management server 100.

The management server 100, the thin clients 200, and the blade servers 300 are coupled to a LAN (Local Area Network) 145 that is an in-house network constructed in a company, etc. This LAN 145 is coupled to the network 140 such as a WAN (Wide Area Network), etc., through a router 146. It can be assumed that the thin client 200 is used being coupled not to any in-house network (in a company, etc.) but to an external network constructed at an isolated place such as a hotel, a station, etc. In this case, the thin client 200 is coupled to a LAN 147 that is an external network and is coupled to the network 140 such as a WAN through a router 148.

The blade server 300 constructs a VPN (Virtual Private Network) between the server 300 and the thin client 200, receives and processes input information (the contents of operations of an input apparatus) sent from the thin client 200 through this VPN, and transmits video information indicating the process result (a desk top screen of a displaying apparatus) to the thin client 200. The blade server 300 is a server apparatus that is used without any input/output apparatus locally coupled thereto.

Figure 2:
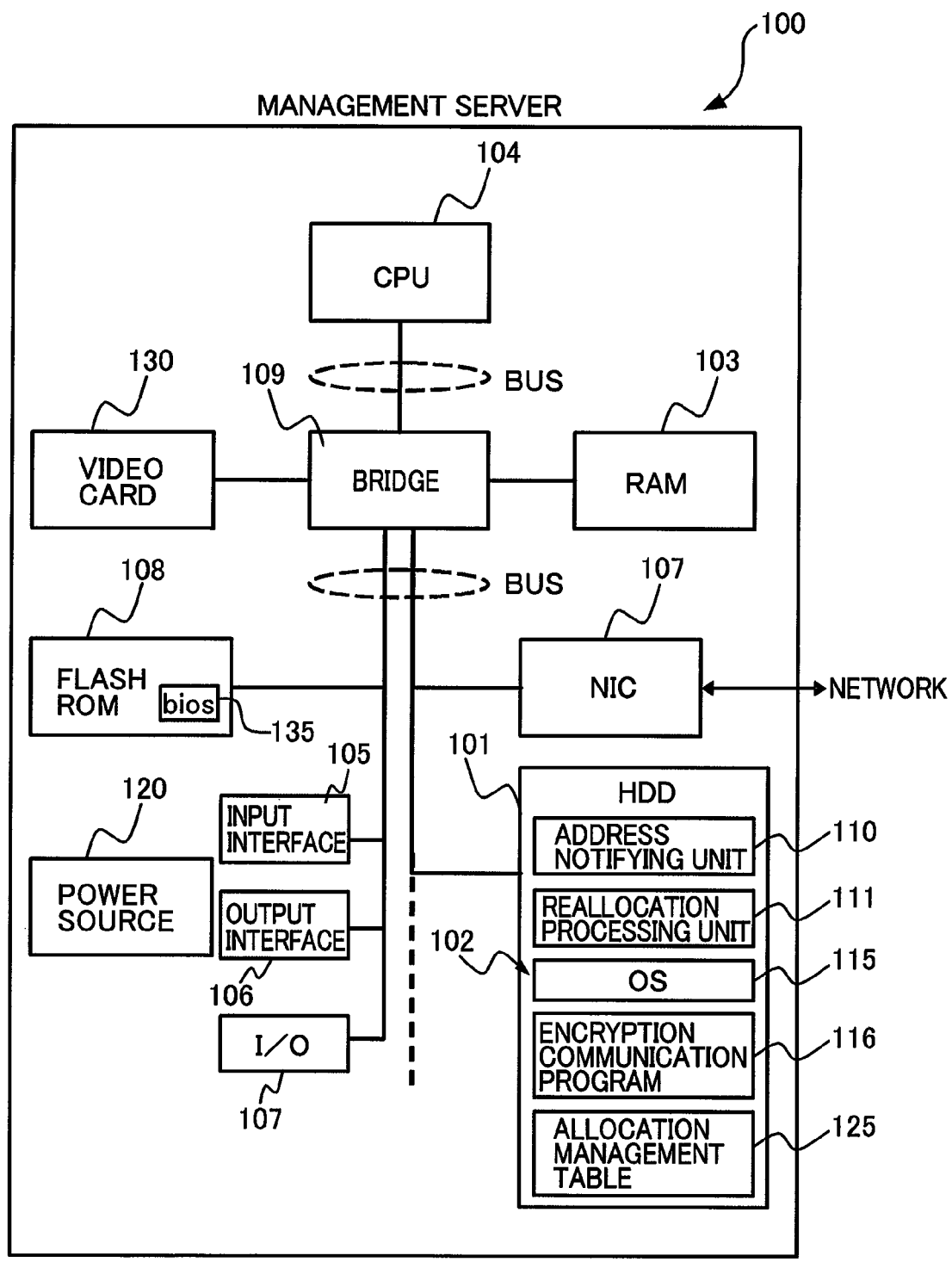
FIG. 2 depicts an exemplary configuration of a management server of the embodiment.

Description will be given for each apparatus that constitutes the thin client system 10 that is the information processing system in the embodiment. FIG. 2 depicts an exemplary configuration of the management server 100 of the embodiment. To include a function that realizes the present invention, the management server 100 reads a program 102 included in a program database stored in a hard disk drive 101, etc., stores the program 102 in a RAM 103, and executes the program 102 using a CPU 104 that is a processor.

The management server 100 includes an input interface 105 such as various keyboards and buttons that a computer apparatus generally includes, an output interface 106 such as a display, and a NIC (Network Interface Card) 107 that undertakes transmission and reception of data to/from the thin client 200 and the blade server 300, etc.

Using the NIC 107, the management server 100 couples to the thin client 200 or the blade server 300 through the network 140 such as, for example, the Internet, a LAN, and a serial interface communication line, and transmits and receives data. The management server 100 includes a flash ROM 108, a video card 130 to couple to a display, a bridge 109 that relays a bus coupling the above components 101 to 130, and a power source 120.

The flash ROM 108 stores a BIOS 135. After the power source 120 is turned on, the CPU 104 first accesses the flash ROM 108, executes the BIOS 135, and, thereby, recognizes the system configuration of the management server 100. The hard disk drive 101 stores an OS 115 in addition to function units and tables. The OS 115 is a program for the CPU 104 to comprehensively control the components 101 to 130 and execute each function unit described later. According to the BIOS 135, the CPU 104 loads the OS 115 from the hard disk drive 101 to the RAM 103 and executes the OS 115. Thereby, the CPU 104 comprehensively controls the components of the management server 100.

Description will be given for function units that the management server 100 constitutes and retains based on, for example, the program 102. It is assumed that the management server 100 includes, in an appropriate storing apparatus thereof such as a hard disc, an allocation management table 125 having stored thereon the correlation between storage information of the portable storage medium 50 that the user of each thin client 200 uses, and the address of the blade server 300 that is a utilization allocation destination of the thin client 200 tied to the portable storage medium 50.

The management server 100 includes an address notifying unit 110 that receives a utilization allocation request that includes storage information of the portable storage medium 50 from the thin client 200, compares the storage information of the portable storage medium 50 included in the utilization allocation request with the allocation management table 125, identifies the address of the blade server 300, and notifies the thin client 200 that is the transmission origin of the utilization allocation request of the identified address.

The management server 100 also includes a reallocation processing unit 111 that, when the unit 111 receives a reallocation request that includes storage information of the portable storage medium 50 from the thin client 200, identifies in the allocation management table 125 an available blade server 300 that is not allocated for utilization to another thin client 200, and stores the address of the available blade server 300 and the storage information included in the reallocation request correlating each other in the allocation management table 125. At this time, the address notifying unit 110 notifies the thin client 200 that is the transmission origin of the reallocation request of the address of the available information processing apparatus.

Figure 3:
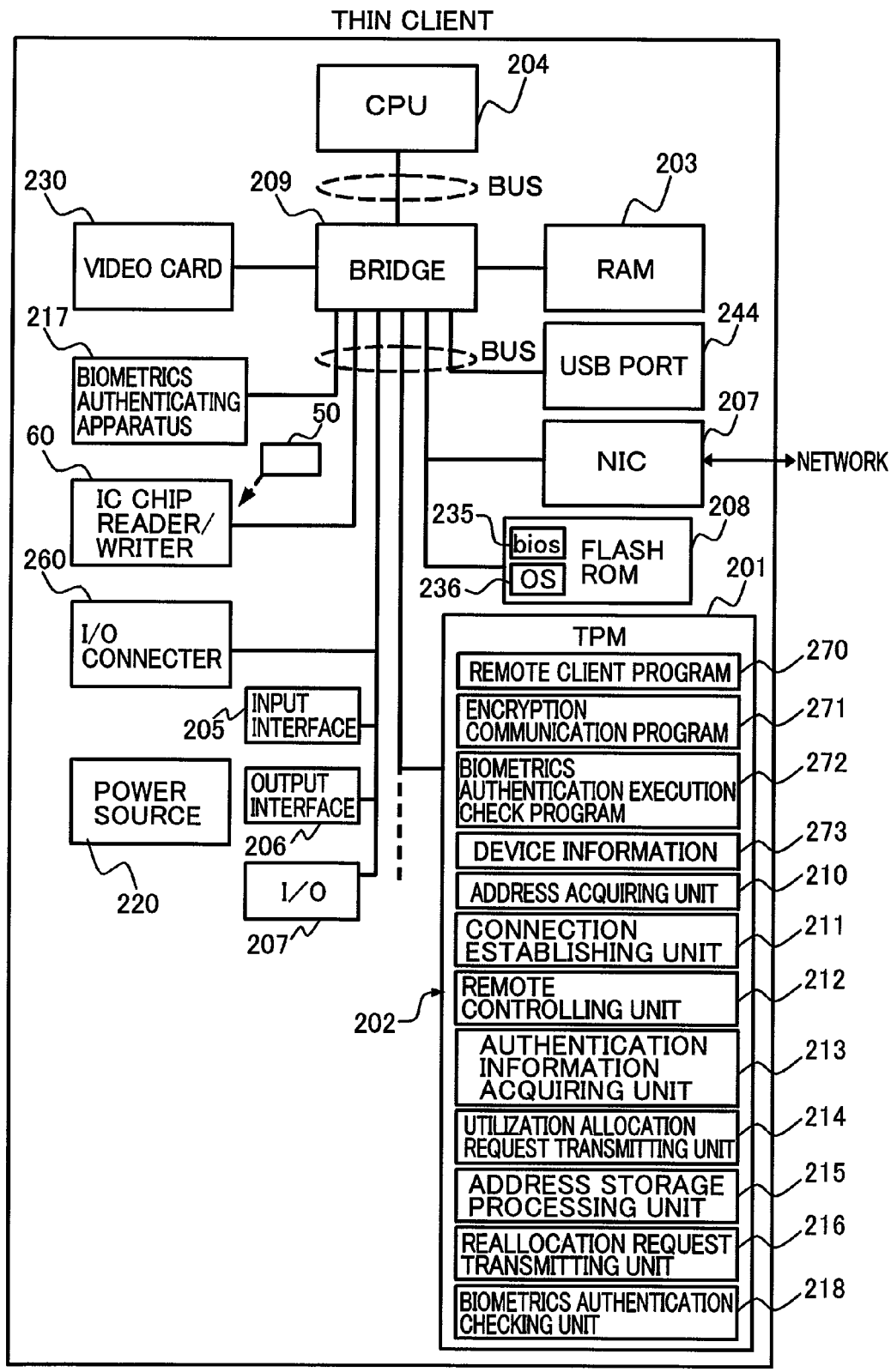
FIG. 3 depicts an exemplary configuration of a thin client that is a terminal of the embodiment.

FIG. 3 depicts an exemplary configuration of the thin client 200 that is the terminal of the embodiment. On the other hand, the thin client 200 is an apparatus that utilizes the blade server 300 through the network 140 according to the utilization allocation process by the management server 100, and reads a program 202 stored in a program database in a TPM 201, etc., stores the program 202 in a RAM 203, and executes the program 202 using a CPU 204 that is a processor, to include the function that realizes the present invention.

The thin client 200 includes an input interface 205 such as various keyboards and buttons that a computer apparatus generally includes, an output interface 206 such as a display, and a NIC 207 that undertakes transmission and reception of data to/from the management server 100 and the blade server 300, etc.

Using the NIC 207, the thin client 200 couples to the management server 100 or the blade server 300 through the network 140 such as, for example, the Internet, a LAN, a serial interface communication line, and transmits and receives data.

The thin client 200 is an HDD-less-type PC and is configured such that no printer, no external drive, no external memory, etc., can be coupled thereto locally or through a network. That is, the thin client 200 is configured to be able to use only a printer, an external drive, an external memory, etc., that are coupled to the blade server 300 locally or through a network. By configuring as above, the possibility of information leakage due to theft, etc., of the thin client 200 is lowered.

The thin client 200 includes a USB port 244 to couple various devices, a flash ROM 208, an I/O coupler 260 to couple to a keyboard and a mouse, a video card 230 to couple to a display, a bridge 209 to relay a bus to couple to these components 210 to 260, and a power source 220. After the power source 220 is turned on, the CPU 204 first accesses the flash ROM 208, executes a BIOS 235, and, thereby, recognizes the system configuration of the thin client 200.

An OS 236 in the flash ROM 208 is a program for the CPU 204 to comprehensively control the components 201 to 260 of the thin client 200 and execute a program corresponding to each function unit described later. According to the BIOS 235, the CPU 204 loads the OS 236 from the flash ROM 208 to the RAM 203 and executes the OS 236. For the OS 236 of the embodiment, an OS having a rather small size that can be stored in the flash ROM 208 such as a built-in-type OS, etc., is used.

Description will be given for function units that the thin client 200 constitutes and retains on the TPM 201 based on, for example, the program 202. The thin client 200 includes an address acquiring unit 210 that reads the storage information of the portable storage medium 50 used by the user of the thin client 200, acquires the address of the blade server 300 that is a utilization allocation destination of the thin client 200 included in the storage information, and stores the data of this address in the RAM 103 that is a memory.

The thin client 200 includes a connection establishing unit 211 that transmits a connection establishment request including at least authentication information of the thin client 200 or the user thereof to the address of the blade server 300 stored in the RAM 103, and executes a connection establishing process for connection between the blade server 300 and the thin client 200 through the network 140 according to response data that blade server 300 returns in response to the connection establishment request.

The thin client 200 includes a remote controlling unit 212 that, associated with the connection establishing process, transmits the operating information input at the input interface 205 of the thin client 200 to the address of the blade server 300, receives video information corresponding to the operating information from the blade server 300, and displays the video information on the output interface 206 of the thin client 200.

The thin client 200 preferably includes an authentication information acquiring unit 213 that acquires the storage information of the portable storage medium 50 that includes the address of the management server 100 that executes the utilization allocating process between the thin client 200 and the blade server 300 from a reader 60 of the portable storage medium 50, and stores this storage information in the RAM 203 that is an appropriate memory.

The thin client 200 may preferably include a utilization allocation request transmitting unit 214 that transmits the storage information of the portable storage medium 50 read from the RAM 203 that is the memory to the address of the management server 100 read from the RAM 203, including the storage information in the utilization allocation request of the blade server 300.

The thin client 200 may preferably include an address storage processing unit 215 that receives from the management server 100 the address of the blade server 300 to be assigned to this thin client 200, and stores the address of the blade server 300 in the portable storage medium 50.

The thin client 200 may preferably include a reallocation request transmitting unit 216 that transmits the reallocation request of the blade server 300 input at the input interface 205 of the thin client 200, together with the storage information of the portable storage medium 50, to the address of the management server 100.

The address storage processing unit 215 receives the address of the available blade server 300 that is re-assigned from the management server 100 to this thin client 200, and executes a process of storing the address of the blade server 300 in the portable storage medium 50.

The reallocation request transmitting unit 216 may preferably detect that at least one of the connection establishing process by the connection establishing unit 211 for the connection to the blade server 300, or the transmitting process of the operating information addressed to the blade server 300 by the remote controlling unit 212 or the receiving process of the video information from the blade server 300 becomes not executable and, in response to this, executes the transmitting process of the reallocation request.

The thin client 200 may include a biometrics authenticating apparatus 217 that acquires biometrics information of a thin client user. In this case, a biometrics authentication checking unit 218 included in the thin client 200 compares the biometrics information acquired by the biometrics authenticating apparatus 217 with biometrics authentication information acquired from the portable storage medium 50 being coupled thereto (that the portable storage medium 50 has stored thereon in advance as the comparison criterion), and executes a biometrics authentication process. When the authentication result is "cannot be authenticated", the utilization allocating process of the server 300 to the thin client 200 is ended.

The thin client 200 in the embodiment retains the address acquiring unit 210, the connection establishing unit 211, the remote controlling unit 212, the authentication information acquiring unit 213, the utilization allocation request transmitting unit 214, the address storage processing unit 215, the reallocation request transmitting unit 216, the biometrics authentication checking unit 218, a remote client program 270, an encryption communication program 271, a biometrics authentication execution checking program 272, device information 273, etc., in a chip referred to as the TPM (Trusted Platform Module) 201.

The TPM 201 has a function like that of a security chip mounted on a smart card (IC card), and is a hardware chip having a calculating function by asymmetry keys and a tamper proofness property to safely store these keys. Functions of the TPM 201 can be, for example: creation and storage of RSA (Rivest-Shamir-Adleman Scheme) secret keys; calculations using the RSA secret keys (signing, encrypting, decrypting); hash calculations based on SHA-1 (Secure Hash Algorithm 1); maintenance of platform condition information (measured values of software) (PCR); maintenance of a reliability chain of the keys, certificates, and credential; creation of high quality random numbers; anonvolatile memory, and, in addition, Opt-in, I/O, etc.

In addition to the creating/storing/calculating functions by encryption keys (asymmetry keys), the TPM has a function of safely storing the platform condition information (the measured values of software) in a register PCR (Platform Configuration Registers) in the TPM 201 and notifying the information. According to the latest specification of the TPM 201, functions such as locality and delegation (transfer of power) are added. The TPM 201 is physically attached to a part (such as a mother board) of a platform.

In the embodiment, the thin client 200 includes the remote client program 270 and an encryption communication program 271 in the TPM 201 therein. The remote client program 270 is a program for the thin client 200 to access the desk top of the blade server 300 from an isolated place, and is, for example, a client (viewer) program of VNC. Guided by the OS 236, the CPU 204 loads the remote client program 270 from the TPM 201 to the RAM 203 and executes the program 270. Thereby, the CPU 204 transmits input information (the contents of the operation of the keyboard and the mouse) of the I/O coupler 260 to the blade server 300 through the network 140 such as the VPN, and outputs video information (a desk top screen of the display) sent from the blade server 300 through the network 140 such as the VPN, etc., to the input/output interface 205, etc., such as the display coupled to the video card 230.

The encryption communication program 271 is a communication program to construct a secure communication network such as a VPN between the thin client 200 and the blade server 300 having the address notified of from the remote client program 270. For example, a communication program using IPsec (Security Architecture for the Internet Protocol) can be assumed. Guided by the OS 236, the CPU 204 loads the encryption communication program 271 from the flash ROM 208 to the RAM 203 and executes the program 271. Thereby, the CPU 204 transmits a communication start request to the blade server 300 assigned to this thin client 200 through the NIC 207, constructs a network such as a VPN between the thin client 200 and the blade server 300, and communicates with the blade server 300 through this VPN, etc.

In the embodiment, the thin client 200 includes the biometrics authentication execution checking program 272 in the TPM 201 therein. The biometrics authentication execution checking program 272 recognizes the hardware configuration of the thin client 200 when the thin client 200 is started up and, when the hardware configuration includes the biometrics authenticating apparatus 217, instructs the biometrics authentication checking unit 218 to start execution of a biometrics authentication process.

The thin client 200 in the embodiment includes the device information 273 in the TPM 201 therein. When the thin client 200 transmits the connection establishment request, etc., the device information 273 is information for authentication of the thin client 200 included in the connection establishment request, etc. More specifically, for example, the ID, the model number, and the MAC address of the thin client 200 can be assumed.

Figure 4:
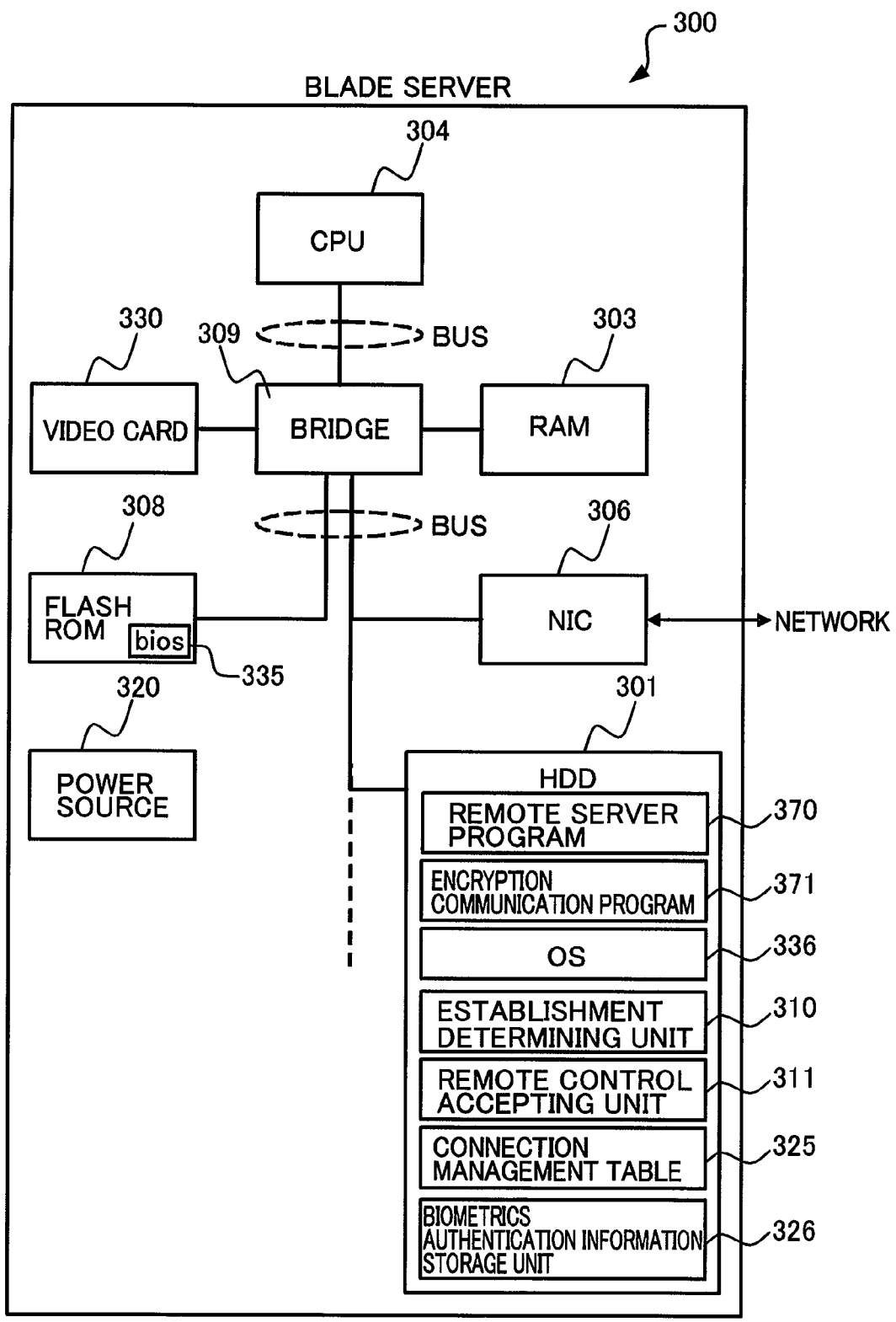
FIG. 4 depicts an exemplary configuration of a blade server that is an information processing apparatus of the embodiment.

FIG. 4 depicts an exemplary configuration of the blade server 300 that is an information processing apparatus of the embodiment. On the other hand, the blade server 300 that is the information processing apparatus is an apparatus that accepts the use from the thin client 200 through a network in response to the utilization allocating process of the management server 100 and, to include functions to realize the present invention, reads a program 302 included in a program database stored in an HDD (Hard Disk Drive) 301, writes the program 302 into a RAM 303, and causes a CPU 304 that is a processor to execute the program.

The blade server 300 includes an input interface 305 such as various keyboards and buttons that a computer apparatus generally includes, an output interface 306 such as a display, and a NIC 307 that undertakes transmission and reception of data to/from the management server 100 and the thin client 200, etc.

Using the NIC 307, the blade server 300 couples to the management server 100 or the thin client 200 through the network 140 such as, for example, the Internet, a LAN, and a serial interface communication line, and transmits and receives data. The blade server 300 also includes a flash ROM (Read Only Memory) 308, a video card 330 to create video information of the desk top, a bridge 309 that relays the above components 301 to 330 with a bus, and a power source 320.

The flash ROM 308 stores a BIOS (Basic Input/Output System) 335. After the power source 320 is turned on, the CPU 304 first accesses the flash ROM 308, executes the BIOS 335, and, thereby, recognizes the system configuration of the blade server 300.

Description will be given for function units that the blade server 300 constitutes and retains based on, for example, the program 302. The blade server 300 includes a connection management table 325 having stored thereon authentication information of the thin client 200, or the user thereof, that is assigned to the blade server 300 for use. Otherwise, the biometrics authentication information of the user that an appropriate authenticating organization (such as a public individual authenticating organization) or the portable storage medium 50, etc., stores may have been acquired in advance through a server of the authenticating organization or the thin client 200 and a biometrics authentication information storage unit 326 may have stored thereon the biometrics authentication information.

The blade server 300 includes an establishment determining unit 310 that receives the connection establishment request transmitted from the thin client 200, compares the authentication information of the thin client 200 or the user thereof included in the connection establishment request with the connection management table 325, determines to permit or reject acceptance of the connection establishment request, and returns the determination result to the thin client 200 as the response data. The establishment determining unit 310 may preferably include in the determining process a biometrics authentication process of comparing the biometrics information (a so-called raw biometrics information read by the biometrics authenticating apparatus 217 of the thin client 200) associated with the connection establishment request, with the biometrics authentication information in the biometrics authentication information storage unit 326. That is, it is preferably determined that the connection establishing process is not executed when the biometrics authentication is not passed.

The blade server 300 includes a remote control accepting unit 311 that, associated with the execution of the connection establishing process for the connection to the thin client 200 in response to the determination result, receives the operating information from the thin client 200, executes information processing according to the contents of the operation indicated by the operating information, and transmits video information indicating the result of the information processing to the thin client 200.

The blade server 300 stores a remote server program 370, an encryption communication program 371, and an OS (Operating System) 336 in the HDD 301 therein. The OS 336 is a program for the CPU 304 to comprehensively control the components 301 to 330 of the blade server 300 and execute each program that realizes each function unit such as the function unit 310, etc. Guided by the BIOS 335, the CPU 304 loads the OS 336 from the HDD 301 to the RAM 303 and executes the OS 336. Thereby, the CPU 304 comprehensively controls the components 301 to 330 of the blade server 300.

The remote server program 370 is a program to enable the desk top of the blade server 300 to be remotely operated from the thin client 200 and is, for example, a server program of VNC (Virtual Network Computing) developed by the AT&T Cambridge Laboratory. Guided by the OS 336, the CPU 304 loads the remote server program 370 from the HDD 301 to the RAM 303 and executes the program 370. Thereby, the CPU 304 receives and processes input information (the contents of operations of the keyboard and the mouse) sent from the thin client 200 through the network 140 such as the VPN, and transmits video information indicating the process result (a desk top screen of the display) to the thin client 200 through the network such as the VPN.

The encryption communication program 371 is a communication program to construct the network 140 such as the VPN between the blade server 300 and the thin client 200 and is, for example, a communication program using IPsec. Guided by the OS 336, the CPU 304 loads the encryption communication program 371 from the HDD 301 to the RAM 303 and executes the program 371. Thereby, the CPU 304 constructs the secure network 140 such as the VPN, etc., between the blade server 300 and the thin client 200 according to the connection establishment request, etc., accepted from the thin client 200 through the NIC 307, and communicates with the thin client 200 through the VPN, etc.

Figure 5:
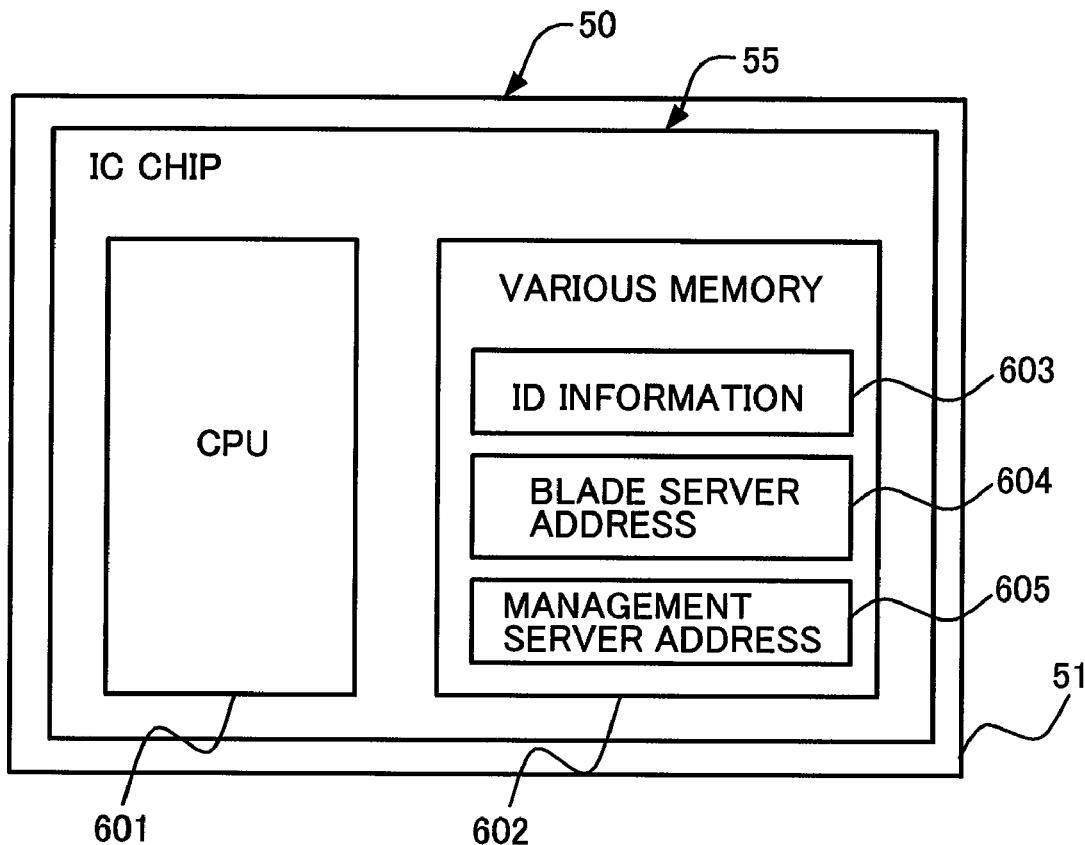
FIG. 5 depicts an exemplary configuration of an IC chip included in a portable storage medium of the embodiment.

FIG. 5 depicts an exemplary configuration of an IC chip 55 included in the portable storage medium 50 of the embodiment. An example of the portable storage medium 50 can be, for example, a USB device that is formed by accommodating the IC chip 55 in an appropriate accommodating case 51 such as a plastic housing and that is data-communicatively coupled to a USB interface of the thin client 200. A chip ID 603 is contained as storage information of the IC chip 55. The IC chip 55 includes a CPU 601 and a memory 602, and the memory 602 stores the information 603 of the chip ID. For the portable storage medium 50, an authenticating device (Key-Mobile™) that has a personal certificate, secret keys, and various pieces of application software necessary for mobile use that are pre-installed in a memory card formed by integrating an IC card unit and a flash memory may be employed. The information that the portable storage medium 50 stores in the memory 62 therein is assumed to be an address 604 of the blade server 300 that is the utilization allocation destination of the thin client 200, and an address 605 of the management server 100 that executes the utilization allocating process between the thin client 200 and the blade server 300.

The function units 110 and 111, 210 to 218, 310 and 311, etc., in the management server 100, the thin client 200, and the blade server 300 that constitute the information processing system 10 may be realized as hardware, or may be realized as programs stored in an appropriate storing apparatus such as a memory, an HDD (Hard Disk Drive), etc. In this case, synchronized with execution of the programs, the CPUs 104, 204, and 304 read the programs from the storing apparatus, write the programs into the RAMs 103, 203, and 303, and execute the programs.

For the network 140, various networks can be employed such as an ATM line or a dedicated line, a WAN (Wide Area Network), an electric power line network, a wireless network, a public line network, a portable telephone network, and a serial interface communication line, in addition to the Internet and a LAN. Using a virtual dedicated network technique such as the VPN (Virtual Private Network) is preferable because communication having improved security is established when the Internet is employed. The serial interface refers to an interface to couple to external apparatuses by serial transmission that serially sends every bit one by one using a single communication line and the communication scheme thereof can be assumed to be the RS-232C, the RS-422, the IrDA, the USB, the IEEE 1394, a Fiber Channel, etc.

—Database Structure—

Figure 6A:
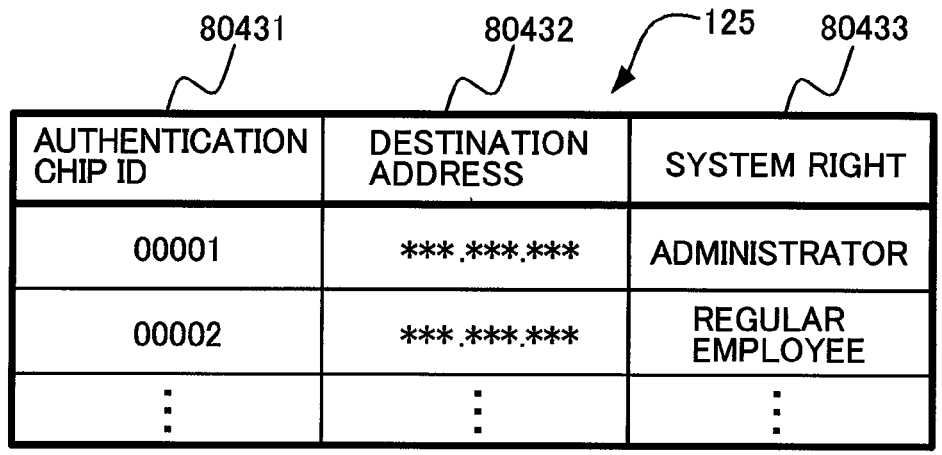
FIG. 6A depicts an exemplary data structure of an allocation management table in the embodiment.
Figure 6B:
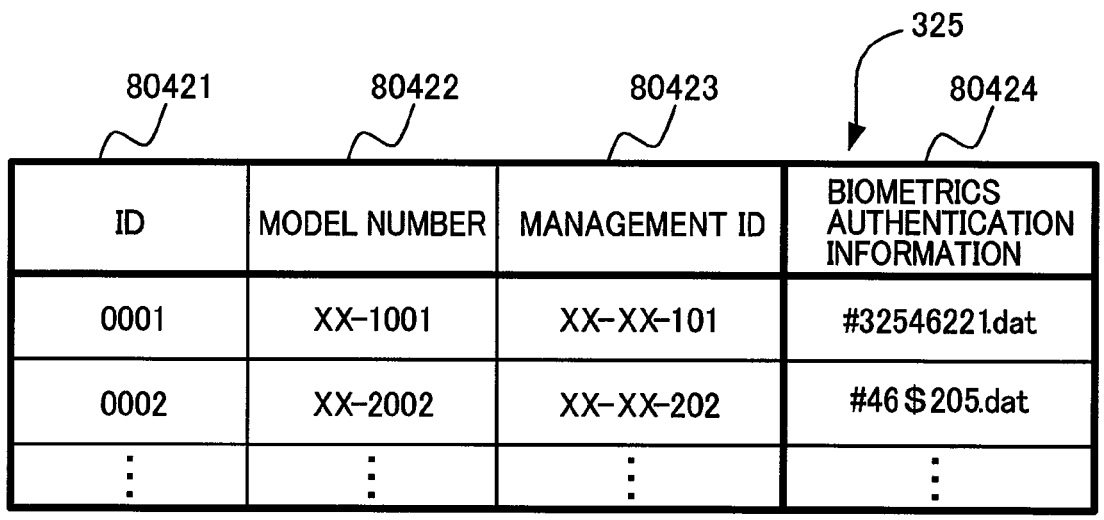
FIG. 6B depicts an exemplary data structure of a connection management table in the embodiment.

Description will be given for the structures of various tables that can be used by the management server 100, the blade server 300, etc., that constitute the information processing system 10 in the embodiment. FIG. 6A depicts an exemplary data structure of the allocation management table 125 in the embodiment and FIG. 6B depicts an exemplary data structure of the connection management table 325 in the embodiment.

The allocation management table 125 is used by the management server 100 and is a table having stored thereon the correlation between the storage information of the portable storage medium 50 that the user of each thin client 200 uses, and the address of the blade server 300 that is a utilization allocation destination of the thin client 200 tied to the portable storage medium 50. The table 125 is, for example, an aggregate of records each correlating pieces of information such as an address 80432 of the blade server 300 and a system authority 80433 (such as the scope of the utilization authority of the blade server 300 corresponding to a duty position, etc.) using a chip ID 80431 of the IC chip 55 included in the portable storage medium 50 as a key. An example of the address 80432 of the blade server 300 may be assumed to be an IP address of the blade server 300 in the network 140.

The connection management table 325 is used by the blade server 300 and is a table having stored thereon the authentication information of the thin client 200, or the user thereof, that is allocated to the blade server 300 for use. The table 325 is a table having stored thereon, for example, authentication information (such as device information such as a MAC address) of each thin client 200 and is, for example, an aggregate of records each correlating pieces of information such as a model number 80422 of the thin client 200, a managing ID 80423 set in the thin client 200, etc., using an ID 80421 of the thin client 200 as a key. In addition, the authentication information stored in the connection management table 325 can be assumed to be biometrics authentication information 80424 (a finger print, an iris, a vein, a face image, a voice print, etc.) of the user of the thin client 200. The authentication information stored in the connection management table 325 can be assumed to be almost same as the storage information stored in the portable storage medium 50 except the address of the thin client 200. That is, the storage information of the portable storage medium 50 is the address of the blade server 300 that is the use allocation destination of the thin client 200, the address of the management server 100, and the authentication information of the thin client 200 or the user thereof.

—Exemplary Process Flow 1—

Description will be given for an actual procedure of an information processing method of the embodiment referring to the drawings. Various operations corresponding to the information processing method described below are realized by a program that is read and written in each RAM of each of the management server 100, the thin client 200, and the blade server 300 that constitute the information managing system 10 and that is executed. The program consists of codes to execute the various operations described below.

Figure 7:
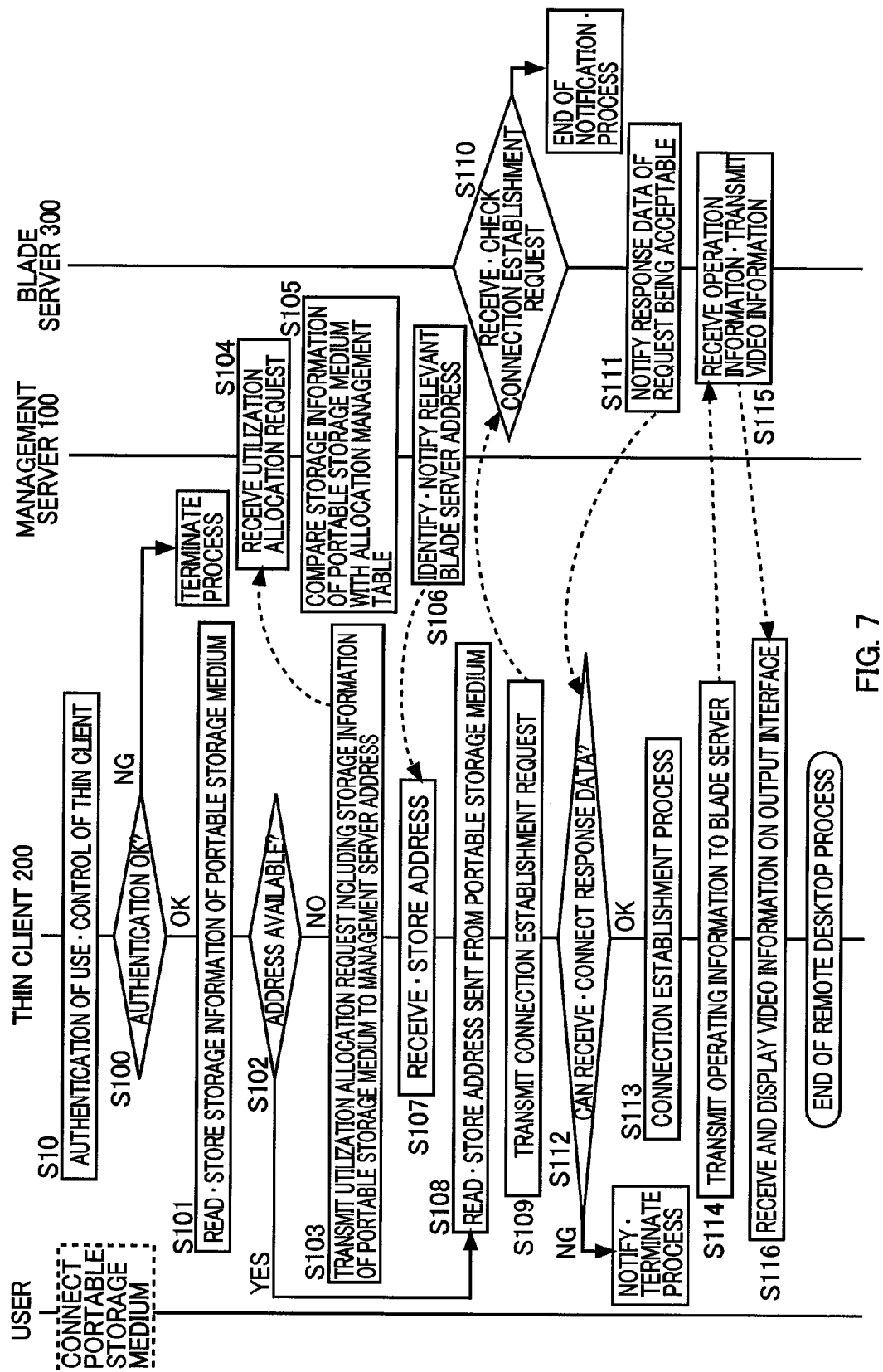
FIG. 7 is an exemplary processing flow 1 of an information processing method in the embodiment.

FIG. 7 is an exemplary processing flow 1 of the information processing method in the embodiment. It is assumed that a user who carries with him/her the portable storage medium 50 that takes the form of a USB device, etc., thinks to use the blade server 300 through the thin client 200. In this case, the user couples the portable storage medium 50 to a USB interface (the reader 60) of the thin client 200. For the portable storage medium 50, an authenticating device (KeyMobile™) that has a personal certificate, secret keys, and various pieces of application software necessary for a mobile use that are pre-installed in a memory card formed by integrating an IC card unit and a flash memory may be employed.

This authenticating device is not merely a storing apparatus and can also store an authenticating application and execute an authenticating process working together with the thin client 200 that is the connection destination. Therefore, at the time when the portable storage medium 50 is coupled to the USB interface of the thin client 200, a control is executed such that, for example, the authenticating application is started up from the storing area of the portable storage medium 50 and, when the input interface 205, etc., input no appropriate authentication information (such as the ID of the user, a password, and the biometrics information), any program necessary for the thin client 200 cannot be started up (s10).

When an authenticating process for the use of the thin client 200 has resulted in an OK in the authenticating application of the portable storage medium 50 (s100: OK), the authentication information acquiring unit 213 of the thin client 200 executes a reading process of the storage information of the portable storage medium 50 and stores the read information (including the address of the management server) in the RAM 203 (s101). On the other hand, when the authenticating process for the use of the thin client 200 has resulted in an NG in the authenticating application of the portable storage medium 50 (s100: NG), the portable storage medium 50 and the thin client 200 do not admit the use itself of the thin client 200 and the processes following this process are ended.

Following the above step s101, the authentication information acquiring unit 213 searches whether the address of the blade server 300 that is to be used is included as the storage information of the portable storage medium 50 and determines the presence or absence of the address information (s102). In this determination, when the address is not included in the storage information read (s102: NO), no blade server 300 is assigned to the thin client 200 for use. On the other hand, when the address is included in the storage information (s102: YES), the process is advanced to s108.

The utilization allocation request transmitting unit 214 of the thin client 200 transmits the storage information (for example, the device information 273 in the TPM 201) of the portable storage medium 50 read from the RAM 203 to the address of the management server 100 stored in the RAM 203 including the storage information in the utilization allocation request of the blade server 300 (s103). For this process, the encryption communication program 271 is started up in the thin client 200. The utilization allocation request transmitting unit 214 notifies the encryption communication program 271 of the address of the management server 100. Having received this address, the encryption communication program 271 secures a network between the thin client 200 and the management server 100, and constructs a secure network environment associated with encryption of communication data.

On the other hand, the address notifying unit 110 of the management server 100 receives the utilization allocation request that includes the storage information of the portable storage medium 50, from the thin client 200 (s104), and compares the storage information of the portable storage medium 50 included in the utilization allocation request with the allocation management table 125 (s105). Assuming that a blade server 300 has been allocated and set in advance for each thin client 200 in the allocation management table 125, the address notifying unit 110 identifies the address of the blade server 300 that is assigned to the thin client 200 and notifies the thin client 200 that is the transmission origin of the utilization allocation request of the identified address (s106).

The address storage processing unit 215 of the thin client 200 receives from the management server 100 the address of the blade server 300 to be assigned to this thin client 200, and stores the address of the blade server 300 in the portable storage medium 50 (s107).

In the thin client 200 that has acquired the address of the blade server 300 in this manner, the address acquiring unit 210 reads again the storage information of the portable storage medium 50, acquires the address of the blade server 300 that is the utilization allocation destination of the thin client 200, and stores the data of this address in the RAM 203 (s108).

In the thin client 200 that has acquired the address of the blade server 300 to be the utilization destination, the connection establishing unit 211 transmits a connection establishment request including at least the authentication information of the thin client or the user thereof to the address of the blade server 300 stored in the RAM 203 (s109). In this process, the connection establishing unit 211 may acquire the biometrics information of the user from the biometrics authenticating apparatus 217 and may include this biometrics information in the authentication information of the connection establishment request.

On the other hand, the establishment determining unit 310 of the blade server 300 receives the connection establishment request transmitted from the thin client 200 and compares the authentication information of the thin client 200 or the user thereof included in the connection establishment request with the connection management table 325 (s110). In this comparing process, when setting of allocation for the thin client 200 or the user thereof is not present in the connection management table 325, it is determined that the acceptance of the connection establishment request is not permitted (s110: NO) and the determination result is returned to the thin client 200 as response data, and the process is ended. On the other hand, when setting of allocation for the thin client 200 or the user thereof is present in the connection management table 325, it is determined that the acceptance of the connection establishment request is permitted (s110: OK) and the determination result is returned to the thin client 200 as the response data (s111).

When the authentication information is compared with the connection management table 325, it is preferable to assume that a process of comparing the biometrics information of the user included in the authentication information with the biometrics authentication information storage unit 326 is executed. When the result of the comparing process of the biometrics information is included in the result of determining the permission or non-permission for the connection establishment request, the security is improved for using the blade server 300 from the thin client 200.

On the other hand, having transmitted the connection establishment request, the thin client 200 receives the response data that the blade server 300 has returned. When this response data represents "connection establishment permitted" (s112: OK), the thin client 200 executes the connection establishing process between the blade server 300 and the thin client 200 through the network 140 (s113). When the response data returned from the blade server 300 represents "connection establishment not permitted" (s112: NG), the processes following this process are ended.

For the connection establishing process, the remote client program 270 stored in the TPM 201 of the thin client 200 may transmit an authentication request to the address of the blade server 300. The blade server 300 returns to the thin client 200 an input request for, for example, a login ID, a password, or biometrics information. When the thin client 200 returns the login ID or the password in response to this input request, the blade server 300 determines whether a login ID, a password, or biometrics authentication information stored in the biometrics authentication information storage unit 326 that the blade server 300 itself manages coincides with the login ID, the password, or the biometrics information originated from the thin client 200 and finally determines to permit or not to permit the use of the blade server 300.

The remote controlling unit 212 of the thin client 200 transmits the operating information input at the input interface 205 of the thin client 200 associated with the execution of the connection establishing process (s114). Associated with the execution of the connection establishing process with the thin client 200 in response to the determination result, the remote control accepting unit 311 of the blade server 300 receives the operating information from the thin client 200, executes information processing according to the contents of the operation indicated by the operating information, and transmits video information indicating the result of the processing to the thin client 200 (s115). The remote controlling unit 212 of the thin client 200 receives this video information and displays this information on the output interface 206 (s116).

It can be assumed that the above data processing about the remote desk top is executed by the remote client program 270 and the remote controlling unit 212 cooperating with each other. Guided by the remote client program 270, the CPU 204 of the thin client 200 transmits the input information (the contents of the operations of the keyboard and the mouse) of the I/O coupler 260 to the blade server 300 through the network 140 and outputs the video information (the desk top screen of the display) sent from the blade server 300 through the network 140 on the output interface 206 such as a display coupled to the video card 230.

In this manner, in the information processing system in the embodiment, one-to-one remote connection can be established between the thin client 200 and the blade server 300 using the portable storage medium 50 such as the authenticating device as the key. For example, if the management server 100 is a server that mediates connection from the thin client 200 to a local machine and also mediates data transmission/reception during the remote connection between the two, the management server 100 must secure a network band necessary for the remote connection for each remote connection and execute processes for the data communication for each remote connection, and the load of processing on the management server 100 must become significantly larger than the load of processing assumed for the management server 100 in the embodiment. Therefore, when the initial setting must only be made in the portable storage medium 50 for the address of the blade server 300 that is the connection destination of the thin client 200 just like the management server 100 in the embodiment, the load of processing on the management server 100 can be suppressed within an appropriate level and an excellent processing efficiency can be maintained. Furthermore, the authenticating device (such as KeyMobile™) having a high tamper proofness is used as the portable storage medium 50 used being coupled to the thin client 200 and the authenticating device stores the address of the blade server 300 that is the connection destination. Thereby, an unauthorized use of the blade server 300 can be excellently suppressed.

—Exemplary Process Flow 2—

Figure 8:
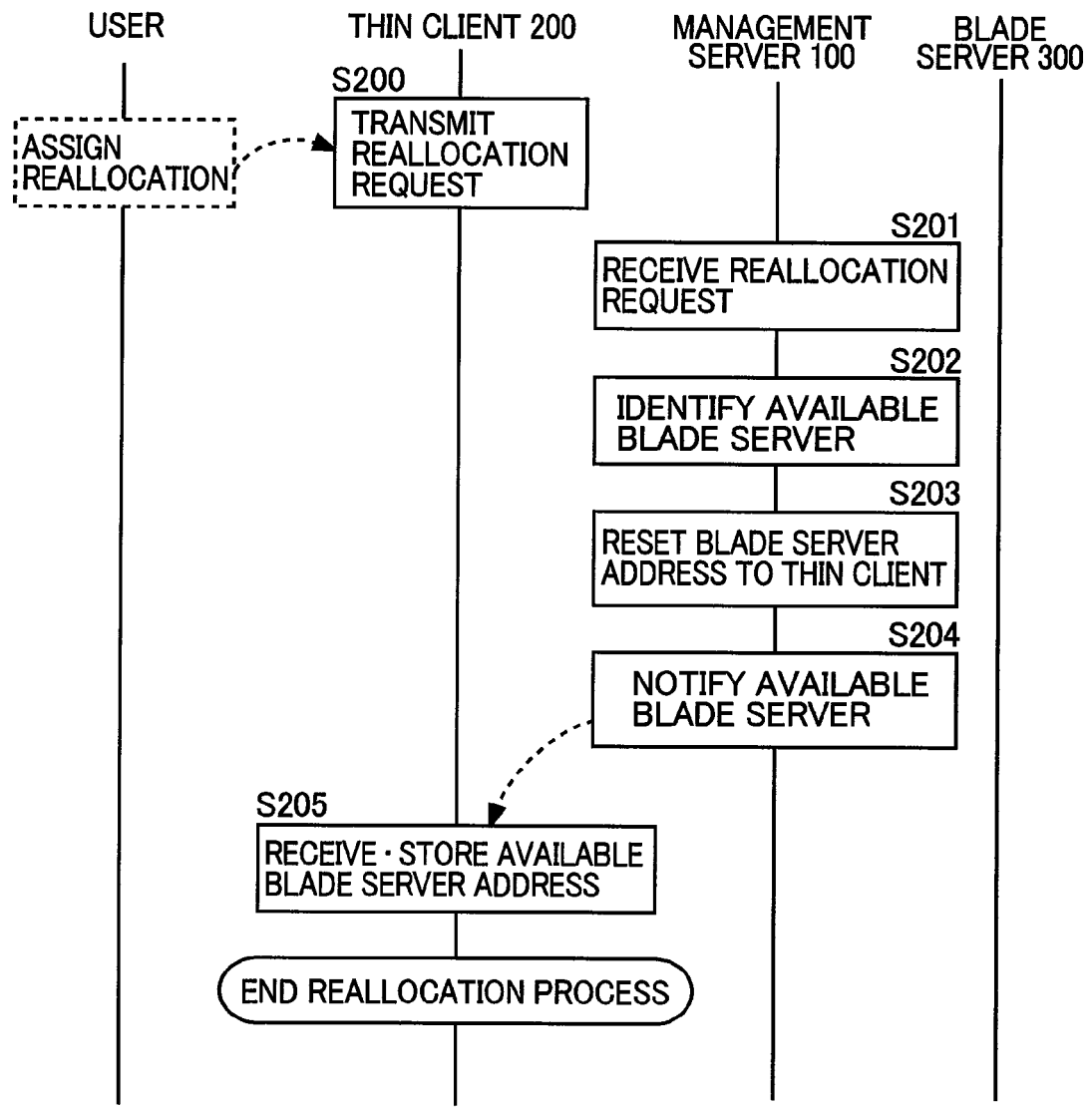
FIG. 8 is an exemplary processing flow 2 of an information processing method in the embodiment.

FIG. 8 is an exemplary processing flow 2 of the information processing method in the embodiment. This flow 2 represents a process to cope with the state where, for example, a fault has occurred to the blade server 300 during the use of the blade server 300 through the thin client 200 and the blade server 300 during use cannot be used.

In this case, the reallocation request transmitting unit 216 of the thin client 200 transmits the reallocation request (similar to the request formed by including in the utilization allocation request the storage information (example: the device information 273, etc., in the TPM 201) of the portable storage medium 50 that is transmitted by the utilization allocation request transmitting unit 214 and that is read from the RAM 203), together with the storage information of the portable storage medium 50, to the address of the management server 100 (s200). The input at the input interface 205 of the reallocation request may be executed, for example, in the case where an appropriate monitoring program (that monitors the connection state between the thin client 200 and the blade server 300) displays on the output interface 206 instruction receiving buttons for necessity of reallocation of the blade server 300 and transmission of a reallocation request and accepts instructions from the user at the time when the state of the access from the thin client 200 to the blade server 300 becomes bad.

Otherwise, the reallocation request transmitting unit 216 may detect that at least one of the connection establishing process with the blade server 300 by the connection establishing unit 211, the transmitting process of the operating information addressed to the blade server 300 by the remote controlling unit 212, or the receiving process of the video information from the blade server 300 becomes not executable and, in response to the detection, may automatically execute the transmitting process of the reallocation request.

On the other hand, the reallocation processing unit 111 of the management server 100 receives from the thin client 200 the reallocation request including the storage information of the portable storage medium 50 (s201), and identifies in the allocation management table 125 an available blade server 300 that is not assigned to another thin client 200 for use (s202). The address of the available blade server 300 is stored in the allocation management table 125 correlated with the storage information included in the reallocation request (s203).

The address notifying unit 110 of the management server 100 notifies the thin client 200 that is the transmission origin of the reallocation request of the address of the available blade server (s204).

At this time, the address storage processing unit 215 of the thin client 200 receives the address of the available blade server 300 reallocated from the management server 100 to this thin client 200 and executes a process of storing the address of the blade server 300 in the portable storage medium 50 (s205). In this manner, the address of the blade server 300 is written in the storing area of the portable storage medium 50 and is used for the connection between the thin client 200 and the blade server 300.

Though the description has been given taking an example of the case where the VPN is constructed between the blade server 300 and the thin client 200 in the above embodiment, the present invention is not limited to this. For example, when the section between the blade server 300 and the thin client 200 is present in the same LAN, communication may be executed between the blade server 300 and the thin client 200 without constructing any VPN.

Though it is preferable to assume the authenticating device to be the authenticating medium 50, in addition, a portable telephone having the same functions and the couplivity to the thin client 200 may be assumed.

The present invention enables a thin client system to realize improvement of the efficiency and securing of appropriate security of a connection process between a thin client and a blade server.

While the present invention has hereinbefore been described in detail based on the embodiment thereof, it is not intended to be limited thereto and various modifications can be made without departing from its spirit.

What is claimed is:

1. An information processing system having a management server, a plurality of server apparatuses and a terminal that are coupled to each other through a network, the terminal comprising:
an address acquiring unit that reads storage information of a portable storage medium used by a user of the terminal, acquires the address of the server apparatus that is a utilization allocation destination of the terminal that is included in the storage information, and stores the data of the address in a memory;
an authentication information acquiring unit that acquires the storage information of the portable storage medium that includes the address of the management server that executes a utilization allocating process between the terminal and the server apparatus from a reader of the portable storage medium, stores the storage information in an appropriate memory, searches whether the address of the server apparatus that is to be used is included as the storage information of the portable storage medium, and determines whether or not the address of the server apparatus is stored in the portable storage medium;
a connection establishing unit that, if the authentication information acquiring unit determines the address of the server apparatus is stored in the portable storage medium, transmits a connection establishment request including at least authentication information of the terminal or the user thereof to the address of the server apparatus stored in the memory, and if the authentication information acquiring unit determines the address of the server apparatus is not stored in the portable storage medium, transmits the connection establishment request to the address of the management server, the connection establishing unit executing a process of establishing connection between the server apparatus and the terminal through the network according to response data that the server apparatus returns in response to the connection establishment request; and
a remote controlling unit that, associated with the execution of the connection establishing process, transmits operating information input at an input interface of the terminal to the address of the server apparatus, receives video information corresponding to the operating information from the server apparatus, and displays the video information on an output interface of the terminal, the server apparatus comprising:
a connection management table having stored thereon authentication information of the terminal or of the user thereof, that is allocated for utilization to the server apparatus;
an establishment determining unit that receives the connection establishment request transmitted from the terminal, compares the authentication information of the terminal or the user thereof included in the connection establishment request with the connection management table, determines to permit or reject acceptance of the connection establishment request, and returns the determination result to the terminal as response data; and a remote operation accepting unit that, associated with the execution of the connection establishing process with the terminal in response to the determination result, receives the operating information from the terminal, executes information processing according to the contents of operations indicated by the operating information, and transmits the video information indicating the result of the information processing to the terminal.

2. The information processing system of claim 1, the terminal comprising:

a utilization allocation request transmitting unit that transmits the storage information of the portable storage medium read from the memory to the address of the management server read from the memory including the storage information in the utilization allocation request of the server apparatus; and an address storage processing unit that receives from the management server the address of the server apparatus to be allocated to this terminal, and stores the address of the server apparatus in the portable storage medium, and the management server comprising:

an allocation management table having stored thereon the correlation between the storage information of the portable storage medium that the user of each terminal uses and the address of the server apparatus that is a utilization allocation destination of the terminal correlated with the portable storage medium, and an address notifying unit that receives from the terminal the utilization allocation request that includes the storage information of the portable storage medium, compares the storage information of the portable storage medium included in the utilization allocation request with the allocation management table, identifies the address of the server apparatus, and notifies the terminal that is the transmission origin of the utilization allocation request of the identified address.

3. The information processing system of claim 2, the terminal comprising:

a reallocation request transmitting unit that transmits a reallocation request of the server apparatus input at the input interface of the terminal, together with the storage information of the portable storage medium, to the address of the management server, wherein the address storage processing unit receives from the management server the address of an available server apparatus that is reallocated to the terminal and executes a process of storing the address of the server apparatus in the portable storage medium, the management server comprising:

a reallocation processing unit that, when the reallocation processing unit receives the reallocation request that includes storage information of the portable storage medium from the terminal, identifies in the allocation management table an available server apparatus that is not allocated for utilization to another terminal, and stores the address of the available server apparatus and the storage information included in the reallocation request correlating each other in the allocation management table, wherein the address notifying unit notifies the terminal that is the transmission origin of the reallocation request of the address of the available server apparatus.

4. The information processing system of claim 3, wherein the reallocation request transmitting unit of the terminal executes a process of transmitting the reallocation request by detecting that at least one of the connection establishing process by the connection establishing unit to the server apparatus, the transmitting process of the operating information addressed to the server apparatus by the remote controlling unit, and the receiving process of the video information from the server apparatus becomes not executable.

5. The information processing system of claim 4, the server apparatus comprising:

a biometrics authentication information storage unit having stored thereon biometrics authentication information for the user of the terminal allocated for utilization to the server apparatus, wherein the establishment determining unit compares the biometrics information of the user included in the connection establishment request received from the terminal with the biometrics authentication information storage unit, determines to permit or reject acceptance of the connection establishment request, and returns the determination result to the terminal as response data.

6. The information processing system of claim 2, the server apparatus comprising:

a biometrics authentication information storage unit having stored thereon biometrics authentication information for the user of the terminal allocated for utilization to the server apparatus, wherein the establishment determining unit compares the biometrics information of the user included in the connection establishment request received from the terminal with the biometrics authentication information storage unit, determines to permit or reject acceptance of the connection establishment request, and returns the determination result to the terminal as response data.

7. The information processing system of claim 3, the server apparatus comprising:

a biometrics authentication information storage unit having stored thereon biometrics authentication information for the user of the terminal allocated for utilization to the server apparatus, wherein the establishment determining unit compares the biometrics information of the user included in the connection establishment request received from the terminal with the biometrics authentication information storage unit, determines to permit or reject acceptance of the connection establishment request, and returns the determination result to the terminal as response data.

8. The information processing system of claim 1, the server apparatus comprising:

a biometrics authentication information storage unit having stored thereon biometrics authentication information for the user of the terminal allocated for utilization to the server apparatus, wherein the establishment determining unit compares the biometrics information of the user included in the connection establishment request received from the terminal with the biometrics authentication information storage unit, determines to permit or reject acceptance of the connection establishment request, and returns the determination result to the terminal as response data.

9. A terminal having a processor and memory coupled to a plurality of server apparatuses and a management server through a network, comprising:

an address acquiring unit that reads storage information of a portable storage medium used by a user of the terminal, acquires the address of the server apparatus that is a utilization allocation destination of the terminal that is included in the storage information, and stores the data of the address in the memory;

an authentication information acquiring unit that acquires the storage information of the portable storage medium that includes the address of the management server that executes a utilization allocating process between the terminal and the server apparatus from a reader of the portable storage medium, stores the storage information in an appropriate memory, searches whether the address of the server apparatus that is to be used is included as the storage information of the portable storage medium, and determines whether or not the address of the server apparatus is stored in the portable storage medium;

a connection establishing unit that, if the authentication information acquiring unit determines the address of the server apparatus is stored in the portable storage medium, transmits a connection establishment request including at least authentication information of the terminal or the user thereof to the address of the server apparatus stored in the memory, and if the authentication information acquiring unit determines the address of the server apparatus is not stored in the portable storage medium, transmits the connection establishment request to the address of the management server, the connection establishing unit executing a process of establishing connection between the server apparatus and the terminal through the network according to response data that the server apparatus returns in response to the connection establishment request; and a remote controlling unit that, associated with the execution of the connection establishing process, transmits operating information input at an input interface of the terminal to the address of the server apparatus, receives video information corresponding to the operating information from the server apparatus, and displays the video information on an output interface of the terminal.

10. A server apparatus having a processor and a memory coupled to a terminal through a network, comprising:

a connection management table having stored thereon authentication information of the terminal, or the user thereof, that is allocated for utilization to the server apparatus;

an establishment determining unit that receives the connection establishment request transmitted from the terminal, compares the authentication information of the terminal or the user thereof included in the connection establishment request with the connection management table, determines to permit or reject acceptance of the connection establishment request, and returns the determination result to the terminal as response data; and a remote operation accepting unit that, associated with the execution of the connection establishing process with the terminal in response to the determination result, receives the operating information from the terminal, executes information processing according to the contents of operations indicated by the operating information, and transmits the video information indicating the result of the information processing to the terminal; and a biometrics authentication information storage unit having stored thereon biometrics authentication information for the user of the terminal allocated for utilization to the server apparatus, wherein the establishment determining unit compares the biometrics information of the user included in the connection establishment request received from the terminal with the biometrics authentication information storage unit, determines to permit or reject acceptance of the connection establishment request, and returns the determination result to the terminal as response data.

11. The server apparatus of claim 10, coupled to a management server through the network, the management server comprising:

an allocation management table having stored thereon the correlation between the storage information of the portable storage medium that the user of each terminal uses and the address of the server apparatus that is a utilization allocation destination of the terminal correlated with the portable storage medium, wherein if the authentication information acquiring unit of the terminal determines the absence of the address information, the utilization allocation request transmitting unit transmits the storage information of the portable storage medium read from the memory to the address of the management server stored in the memory including the storage information in the utilization allocation request of the server apparatus, an address notifying unit of the management server receives from the terminal the utilization allocation request, compares the storage information of the portable storage medium included in the utilization allocation request with the allocation management table, identifies the address of the server apparatus, and notifies the terminal that is the transmission origin of the utilization allocation request of the identified address, and the address storage processing unit of the terminal receives from the management server the address of the server apparatus to be assigned to the terminal, and stores the address of the server apparatus in the portable storage medium.

* * * * *